(12) United States Patent
Chang

(10) Patent No.: US 11,454,210 B2
(45) Date of Patent: Sep. 27, 2022

(54) FLUID TURBINE BLADE DEVICE

(71) Applicant: Tien-Ming Chang, Kaohsiung (TW)

(72) Inventor: Tien-Ming Chang, Kaohsiung (TW)

( * ) Notice: Subject to any disclaimer, the term of this patent is extended or adjusted under 35 U.S.C. 154(b) by 0 days.

(21) Appl. No.: 17/175,067

(22) Filed: Feb. 12, 2021

(65) Prior Publication Data
US 2021/0164438 A1 Jun. 3, 2021

Related U.S. Application Data

(62) Division of application No. 16/442,890, filed on Jun. 17, 2019, now abandoned.

(51) Int. Cl.
*F03D 3/06* (2006.01)
*F03D 80/70* (2016.01)
*F03D 3/00* (2006.01)

(52) U.S. Cl.
CPC .............. *F03D 3/005* (2013.01); *F03D 3/061* (2013.01); *F03D 80/70* (2016.05); *F05B 2240/214* (2013.01); *F05B 2240/30* (2013.01)

(58) Field of Classification Search
CPC .......... F03D 3/005; F03D 13/20; F03D 80/70; F05B 2240/51
See application file for complete search history.

(56) References Cited

U.S. PATENT DOCUMENTS

| | | | | |
|---|---|---|---|---|
| 6,147,415 A * | 11/2000 | Fukada | ................... | F03D 15/20 290/55 |
| 7,417,334 B2 * | 8/2008 | Uchiyama | ................ | H02K 7/14 290/55 |
| 7,462,950 B2 * | 12/2008 | Hu | ........................ | F16C 39/066 290/55 |
| 7,510,366 B2 * | 3/2009 | Okubo | .................... | F03D 3/064 415/4.4 |
| 7,980,823 B2 * | 7/2011 | Akamine | ................ | F03D 3/062 290/55 |
| 8,338,976 B2 * | 12/2012 | Kazadi | .................... | F03D 80/70 290/44 |
| 8,513,826 B2 * | 8/2013 | Mazur | ....................... | F03D 9/25 417/423.4 |
| 2010/0060001 A1 * | 3/2010 | Gabrys | .................. | F03D 3/005 290/44 |

\* cited by examiner

*Primary Examiner* — Justin D Seabe
(74) *Attorney, Agent, or Firm* — Muncy, Geissler, Olds & Lowe, P.C.

(57) ABSTRACT

A fluid turbine blade device includes a vertical axis support base having a fulcrum-forming depression which acts as a first part, and a rotary assembly including a hub lid and a sleeve member rotatably surrounding the vertical axis support base. The hub lid has a projection acting as a second part and rotatably connected to the first part. The fluid turbine blade device further includes a plurality of blade modules mounted to the sleeve member and acted upon by fluid to drive the sleeve member to rotate, and a collision avoidance unit including a plurality of magnets disposed on the outside of the vertical axis support base and the inside of the rotary assembly to produce repulsive force.

2 Claims, 5 Drawing Sheets

FLUID TURBINE BLADE DEVICE

CROSS REFERENCE TO RELATED APPLICATIONS

The present application claims priority to U.S. patent application Ser. No. 16/442,890, which was filed on Jun. 17, 2019, the entire contents of which are hereby incorporated by reference.

FIELD

The disclosure relates to a green energy power generation equipment, more particularly, to a blade device suitable for use with fluid turbines for generating power using moving fluids such as wind and water.

BACKGROUND

Referring to FIG. 1, a prior fluid turbine blade device comprises a vertical axis support base 91 and a blade assembly 92 mounted coaxially on the vertical axis support base 91. The blade assembly 92 is capable of rotating about the axis of the support base 91 under the action of fluid. In order to have a smooth rotation of the blade assembly 92, a rotation auxiliary means (not shown) such as a bearing, a roller or the like is usually applied at between the vertical axis support base 91 and the blade assembly 92 to hold the two and to minimize friction therebetween. Although the rotation auxiliary means can greatly reduce the friction generated when the blade assembly 92 is driven to rotate, in the absence of proper maintenance, it will gradually wear under long-term use to increase the friction during the rotation of the blade assembly 92, and this in turn reduce the power generation efficiency.

SUMMARY

Therefore, the object of the disclosure is to provide a fluid turbine blade device that overcomes at least one of the disadvantages of the prior art.

According to the disclosure, a fluid turbine blade includes a vertical axis support base, a rotary assembly, a collision avoidance unit, and a plurality of blade modules. The vertical axis support base extends along a vertical axis, and includes top section that has a first part located at the vertical axis. The rotary assembly is coaxially mounted to the vertical axis support base, and includes a hub lid rotatably and coaxially assembled with the vertical axis support base, and a sleeve member extending downward from the hub lid and radially spaced from the vertical axis support base. The hub lid has a second part that is coaxially connected to the first part and that is rotatable about the vertical axis relative to the first part, with one of the first part and the second part including a depression and the other including an operatively associated projection. The collision avoidance unit is arranged between the vertical axis support base and the rotary assembly, and includes a plurality of first magnets disposed on the outside of the vertical axis support base, and a plurality of second magnets disposed on the inside of the rotary assembly and corresponding respectively in position to the first magnets for producing a repulsive force between the plurality of first magnets and the plurality of second magnets. Each blade module includes a blade (41) spaced from the rotary assembly, and a link rod assembly coupled between the rotary assembly and the blade. The blade is acted upon by fluid to drive the sleeve member to rotate.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
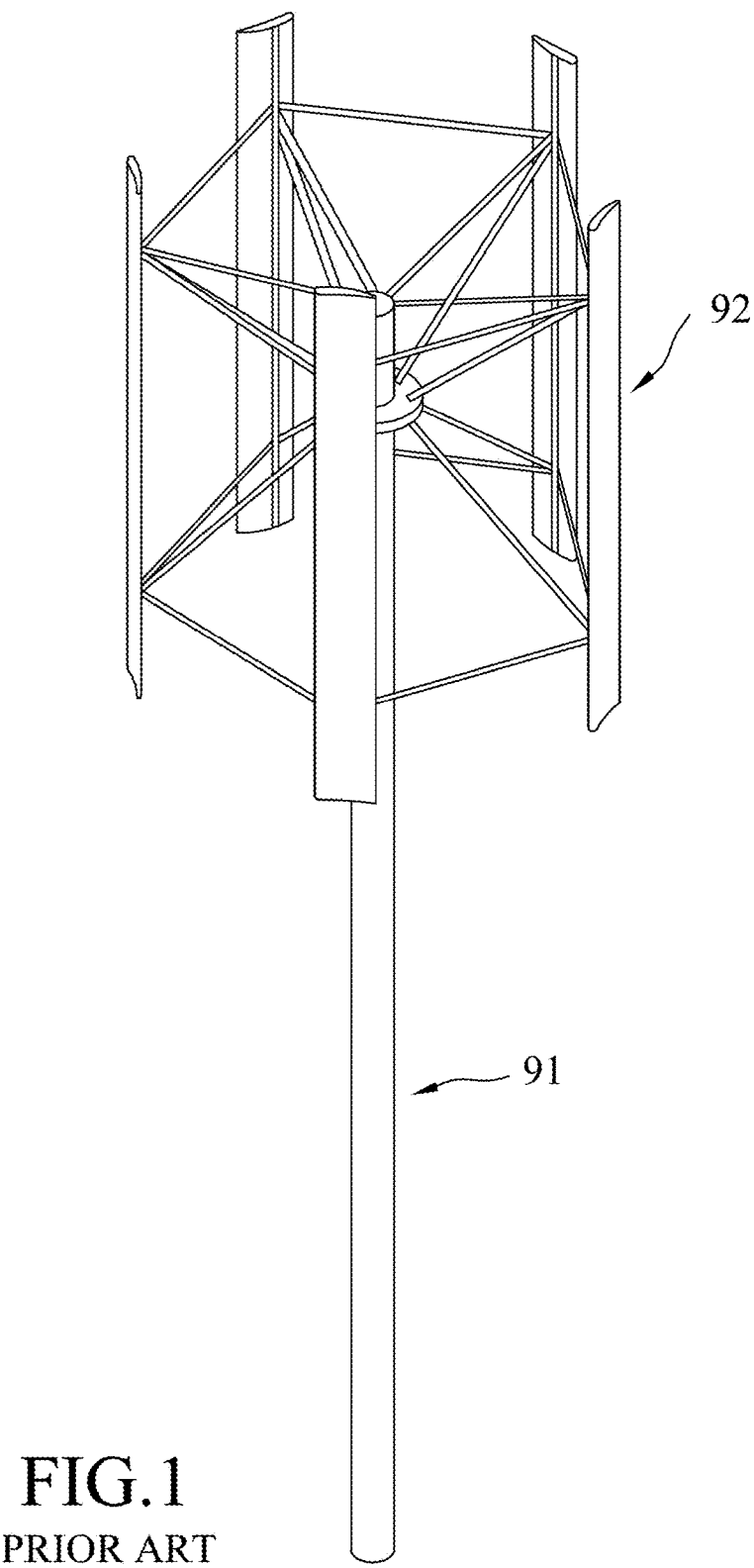
FIG. 1 is a perspective view of a conventional fluid turbine blade device.

Before the present disclosure is described in greater detail, it should be noted that where considered appropriate, reference numerals have been repeated among the figures to indicate corresponding or analogous elements, which may optionally have similar characteristics.

Figure 2:
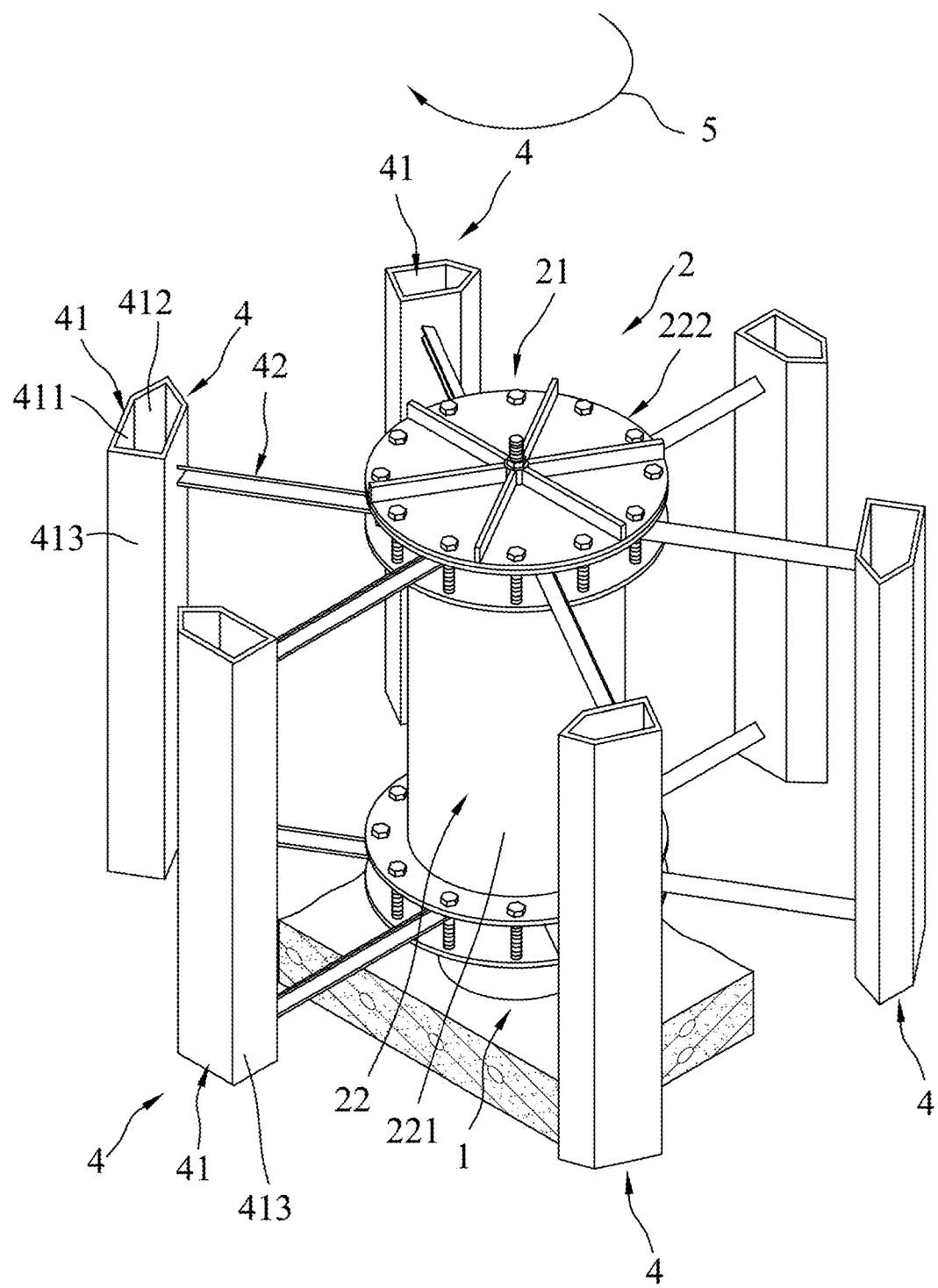
FIG. 2 is a perspective view of a first embodiment of the fluid turbine blade device in accordance with the present disclosure.
Figure 3:
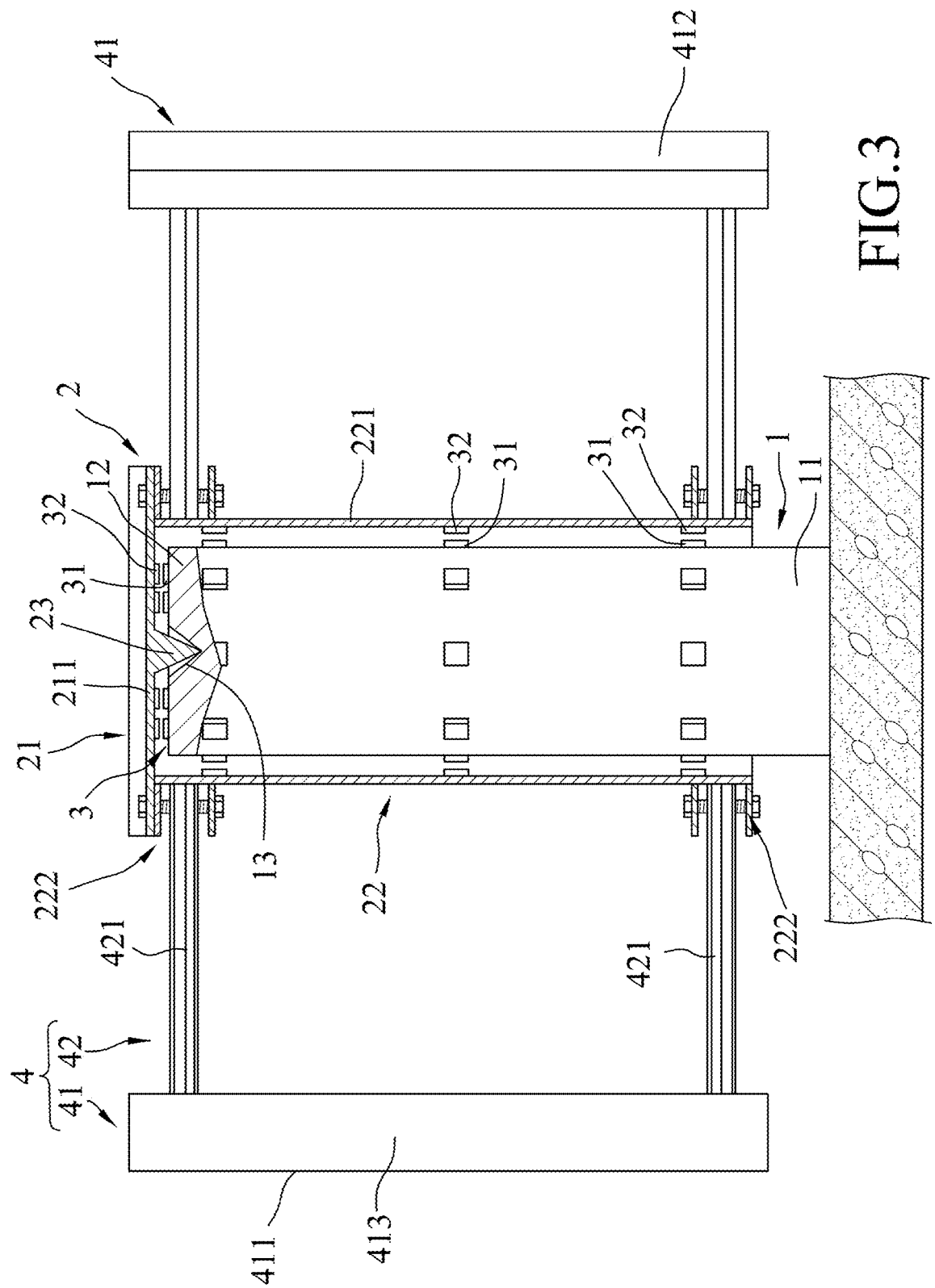
FIG. 3 is a cross-sectional view of the first embodiment.

As shown in FIGS. 2 and 3, the first embodiment of the fluid turbine blade device according to the present disclosure includes a vertical axis support base 1, a rotary assembly 2, a collision avoidance unit 3, and a plurality of blade modules 4.

The vertical axis support base 1 extends along a vertical axis, and includes a support frame section 11 for standing on the ground, and a top section 12 integrated into the upper end of the support frame section 11. The top section 12 includes a first part 13 located at the vertical axis and configured as a conical fulcrum-forming depression on the top surface of the top section 12.

The rotary assembly 2 is coaxially mounted to the vertical axis support base 1 and capable of rotating around the vertical axis support base 1 in a rotation direction 5. The rotary assembly 2 includes a hub lid 21 rotatably and coaxially assembled with the vertical axis support base 1, and a sleeve member 22 extending downward from the hub lid 21 and sleeved around and radially spaced from the vertical axis support base 1. The hub lid 21 has a lid body 211 vertically spaced from the top section 12, and a second part 23 coaxially connected to the first part 13 and rotatable about the vertical axis relative to the first part 13. In this embodiment, the second part 23 is configured as a conical projection extending from the lid body 21 for inserting into the first part 13. The sleeve member 22 includes a tubular body 221 surrounding the support base 1, and two vertically-spaced fastening units 222 attached on an outer surface of the tubular body 221. Each blade module 4 is secured to the two fastening units 222.

The collision avoidance unit 3 is arranged between the vertical axis support base 1 and the rotary assembly 2, and includes a plurality of first magnets 31 disposed on the outside of the vertical axis support base 1, and a plurality of second magnets 32 disposed on the inside of the hub lid 21 and the sleeve member 22 and corresponding respectively in position to the first magnets 31, with the second magnets 32 arranged to have the same magnetic pole disposition as that of the corresponding first magnets 31, such that a repulsive force is generated between the first magnets 31 and the second magnets 32.

The blade modules 4 are distributed radially around the sleeve member 22 at an angular interval. Each blade module 4 includes a blade 41 spaced radially from the rotary assembly 2, and a link rod assembly 42 coupled between the sleeve member 22 and the blade 41. The link rod assembly 42 of each blade module 4 includes two link rods 421 which are fixedly and respectively attached to the fastening units 222 and extended to the respective blade 41. The blade 41 of each blade module 4 includes a first portion 411 that has a surface 413 extending lengthwise vertically with the a width thereof substantially radial to the support base 1, and a second portion 412 having a wedge leading edge toward the rotation direction 5.

Taking the wind turbine as an example, when the blade device of the first embodiment is running, the blades 41 are acted upon by the wind to drive the rotary assembly 2 to rotate around the support base 1, since the support base 1 and the rotary assembly are coaxially associated through contact only between the first part 13 and the second part 23, the contact friction between the support base 1 and the rotary assembly 2 can be minimized. Moreover, the repulsive force produced by the magnetic pole dispositions of the first magnets 31 and the second magnets 32 will keep a smooth rotation of the rotary assembly 2 around the support base 1 not to tilt. Furthermore, for each of the blade modules 4, the first portion 411 is configured to be a rectangular flat surface, and the second portion 412 is configured to be a wedge leading edge which has a relatively low form drag. The cooperation of the first portion 411 and the second portion 412 of the blade 41 can drive the rotary assembly 2 to rotate more efficiently.

Figure 4:
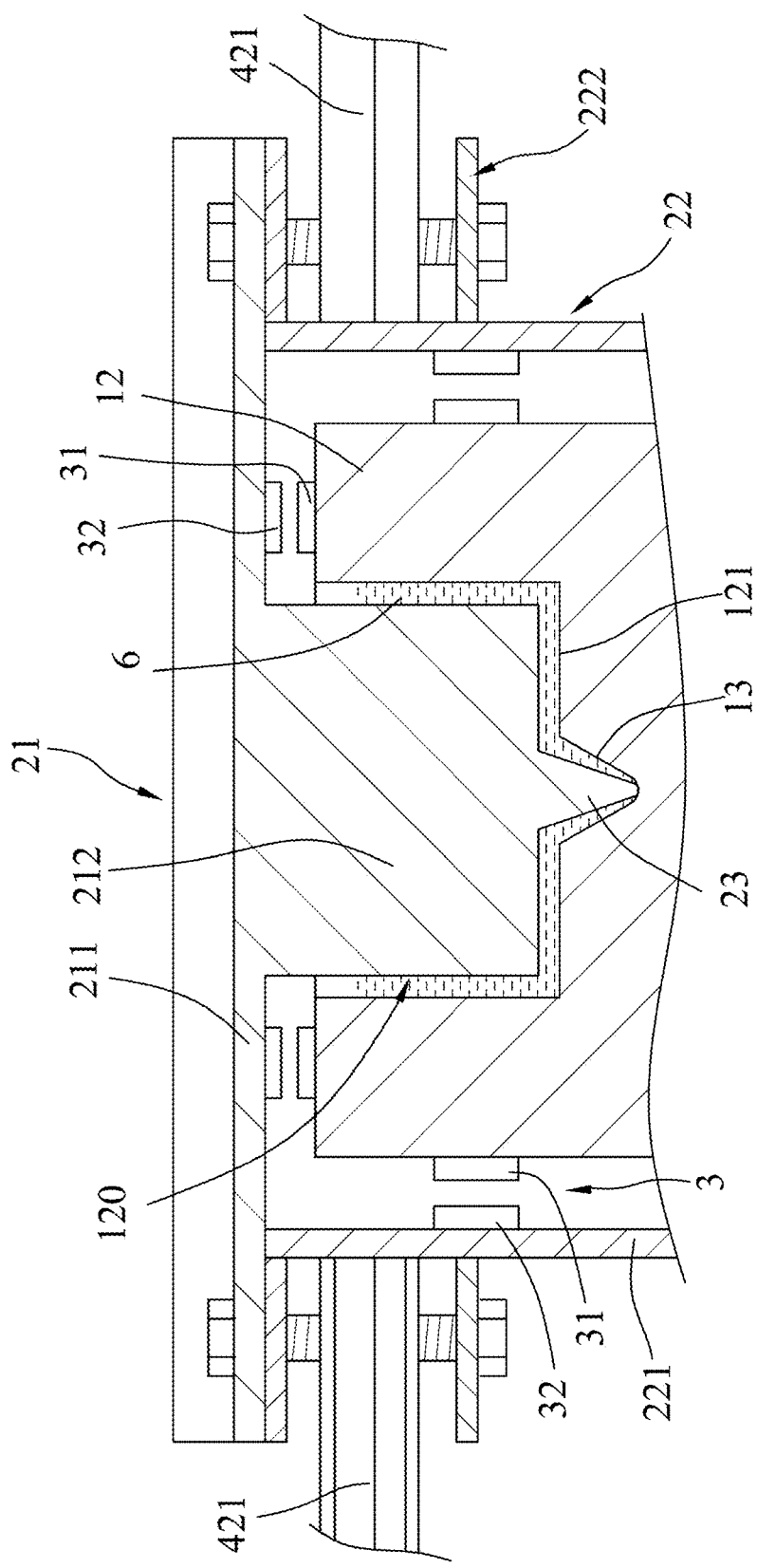
FIG. 4 is a fragmented cross-sectional view of a second embodiment of the fluid turbine blade device in accordance with the present disclosure.

As shown in FIG. 4, the second embodiment has a structure similar to that of the first embodiment. The main difference between this embodiment and the previous embodiment resides in the configuration of the hub lid 21 and the support base 1. The second embodiment has the same advantages as those of the first embodiment.

The upper end of the top section 12 includes a cavity 120 for holding lubricant 6, and the cavity 120 has a bottom surface 121 that defines a conical fulcrum-forming depression which is in communication with the cavity 120 and which acts to act as the first part 13. The hub lid 21 includes a lid body 211 positioned spaced above the vertical axis support base 1, and a protrusion 212 downward extending from the lid body 211 into the cavity 120, and defining a conical pivot projection which extends downward from the lower end of the protrusion 212 to act as the second part 23.

The protrusion 212 is inserted into the cavity 120, with the second part 23 rotatably supported by the first part 13 to constitute the only contact surface between the protrusion 212 and the wall of the cavity 120, while maintaining a space for holding the lubricant 6 between the wall of the cavity 120 and the protrusion 212. With this arrangement, the cavity 120 containing the lubricant 6 will limit the tilt angle of the protrusion 212 when subject to an unbalanced force, and thus to prevent the sleeve member 22 from bumping into the support base 1.

Figure 5:
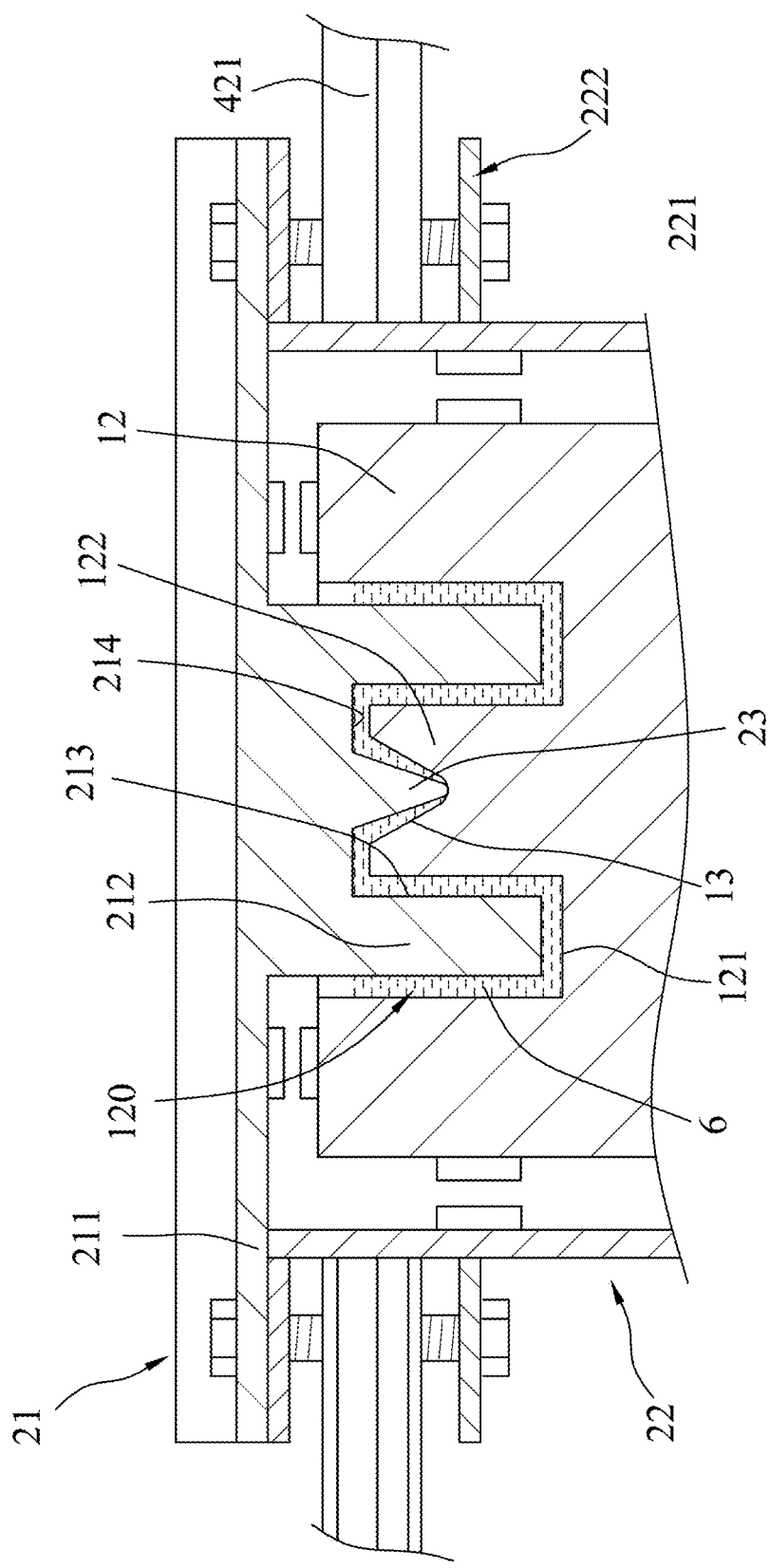
FIG. 5 is a fragmented cross-sectional view of a third embodiment of the fluid turbine blade device in accordance with the present disclosure.

Referring to FIG. 5, the third embodiment has a structure similar to that of the first embodiment. The main difference between this embodiment and the first embodiment resides in the configuration of the cavity 120 and the protrusion 212. The third embodiment has the same advantages as those of the first and second embodiments.

The top section 12 of the vertical axis support base 1 includes a cavity 120 on the top end thereof, with a positioning column 122 extending upward along the vertical axis from the bottom surface 121 of the cavity 120. The first part 13 is provided as a fulcrum-forming depression formed on a top surface of the positioning column 122 and in communication with the cavity 120. The protrusion 212 extends downward from the lid body 211 into the cavity 120, and includes a positioning concavity 213 on the central bottom side for insertion of the positioning column 122. The positioning concavity 213 has an upper surface 214 that defines a pivot projection acting as the second part 23 for rotatably associated with the first part 13. With the lubricant 6 held in the cavity 120 and the positioning concavity 213, the cooperation of the positioning column 122 and the positioning concavity 213 allows stable rotation of the rotatary assembly 2 around the support base 1 and not likely to tilt.

It is particularly noted that, in all of the above embodiments, the depression of the first part 13 and the projection of the second part 23 can be exchanged for the same purpose of rotating the rotary assembly 2 around the support base 1. Besides, it should be noted that, while the first part 13 and the second part 23 in this disclosure are exemplified as being conical, other configurations, for example, hemispherical may be employed in other embodiments. Through the rotatable contact between the first part and the second part 23 of alternative configurations, the rotary assembly 2 is allowed to rotate around the support base 1 with smaller contact area.

In summary, the fluid turbine blade device of the present disclosure has the effect of rotating the rotary assembly 2 around the support base 1 through the first part 13 and the second part 23, and preventing the sleeve member 22 from tilting and bumping into the support base 1 through the magnetic repulsive force produced by the collision avoidance unit 3, so that the rotary assembly 2 is capable of smoothly rotating around the support base 1 without relying on bearings or other auxiliary components. The presently disclosed blade device when applied in fluid turbines can improve the efficiency of power generation and reduce the need for maintenance. Therefore, the object of the present disclosure has been achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fluid turbine blade device, comprising:

a vertical axis support base extending along a vertical axis, and including a top section that has a first part located at the vertical axis;

a rotary assembly coaxially mounted to said vertical axis support base, and including a hub lid that is rotatably and coaxially assembled with said vertical axis support base, and a sleeve member that extends downward from said hub lid and that is radially spaced from said vertical axis support base, said hub lid having a second part that is coaxially connected to said first part; and that is rotatable about the vertical axis relative to said first part;

a collision avoidance unit arranged between said vertical axis support base and said rotary assembly, and including a plurality of first magnets that are disposed on the outside of said vertical axis support base, and a plurality of second magnets that are disposed on the inside of said rotary assembly and that correspond respectively in position to said first magnets for producing a repulsive force between said plurality of first magnets and said plurality of second magnets; and a plurality of blade modules, each blade module including a blade that is spaced from said rotary assembly, and a link rod assembly that is coupled between said rotary assembly and said blade, said blade being acted upon by fluid to drive said sleeve member to rotate wherein said top section includes a cavity on an upper end thereof for holding lubricant, said cavity having a bottom surface that defines said first part in communication with said cavity;

wherein said hub lid includes a lid body positioned above and spaced apart from said vertical axis support base, and a protrusion extending downward from said lid body into said cavity and defining said second part on a lower end thereof for rotatably connected to said first part;

wherein said first part is a fulcrum-forming depression on said bottom surface of said cavity, and said second part is a projection downward extending from said lower end of said protrusion; and wherein said fulcrum-forming depression and said projection are conical.

2. The fluid turbine blade device as claimed in claim 1, wherein said rotary assembly is rotatable about the vertical axis in a rotational direction, said blade of each of said blade modules including a first portion that has a surface extending lengthwise vertically with a width thereof being substantially radial to said vertical axis support base, and a second portion that has a wedge leading edge toward the rotational direction.

* * * * *